ABSTRACT

United States Patent [19]

Howland et al.

[11] Patent Number: 4,712,383

[45] Date of Patent: Dec. 15, 1987

[54] COMPARTMENTALIZED TRANSPORT REFRIGERATION SYSTEM

[75] Inventors: Leland L. Howland, Belle Plaine; Jayaram Seshadri, Minneapolis, both of Minn.

[73] Assignee: Thermo King Corporation, Minneapolis, Minn.

[21] Appl. No.: 36,537

[22] Filed: Apr. 9, 1987

Related U.S. Application Data

[62] Division of Ser. No. 915,601, Oct. 6, 1986, Pat. No. 4,685,306.

[51] Int. Cl.$^4$ ............................................. F25B 5/00
[52] U.S. Cl. ........................................ 62/200; 62/239
[58] Field of Search .................. 62/117, 199, 200, 239, 62/152, 278

[56] References Cited

U.S. PATENT DOCUMENTS 2,633,714  4/1953  Wehby .......................... 62/239 X
2,960,840  11/1960  Hosken et al. ................. 62/278 X
3,786,648  1/1974  Rice ............................... 62/200
4,439,998  4/1984  Howay et al. .................. 62/200 X
4,622,828  11/1986  Fujiwara et al. ............... 62/200

*Primary Examiner*—William E. Tapolcai
*Attorney, Agent, or Firm*—D. R. Lackey

[57] ABSTRACT

A compartmentalized transport refrigeration system, and method of operating same, in which a host refrigeration unit controls the temperature of the air in a front compartment of a trailer, and a remote evaporator unit controls the temperature of the air in a rear compartment. In order to increase the heating capacity of the remote evaporator, the host's hot gas line is selectively controlled to enable all of the hot gas from the compressor to be directed to the remote evaporator when the host unit is in null. The host unit can only heat when the remote unit is in null. In order to increase the cooling capacity of the remote unit, the host's liquid line in selectively controlled to enable the liquid from the receiver to be all directed to the remote evaporator unit when the host unit is in null.

4 Claims, 5 Drawing Figures

COMPARTMENTALIZED TRANSPORT REFRIGERATION SYSTEM

This is a division of application Ser. No. 915,601, filed Oct. 6, 1986, now U.S. Pat. No. 4,685,306.

CROSS REFERENCE TO RELATED APPLICATION

Our co-pending application Ser. No. 036,539 filed concurrently with the present application (identified with assignee's docket number 53449) also relates to a compartmentalized transport refrigeration system.

BACKGROUND OF THE INVENTION

1. Field of the Invention

The invention relates in general to transport refrigeration systems, and more specifically to transport refrigeration systems in which the temperature of the air in each of two or more separate compartments of a trailer is to be controlled.

2. Description of the Prior Art

Transport refrigeration systems often utilize multi-temperature control for controlling the air temperature in two or more separate compartments of a multi-temperature trailer. For example, a trailer may carry a frozen load in the front compartment, which is controlled by the main refrigeration unit called the host unit, and fresh loads in the one or more remote compartments, which are controlled by remote evaporators. Some prior art systems utilize electric heaters supplied by an alternator to provide heat for a remote compartment. In order to provide the necessary alternator output, the dedicated prime mover, such as a Diesel engine, is operated at the higher of two normal operating speeds used at various times during the process of controlling the temperatures of the loads. For example, the higher of the two speeds may be 2200 RPM and the lower may be 1400 RPM. Operating the engine at high speed, however, when a rear compartment requires heat, often results in the front compartment getting extremely cold. While the compartments are separated and heat insulated from one another, the extreme cold in the forward compartment may leak to the adjacent compartment, which thus increases the need for heat in the adjacent compartment. The engine must thus run a longer time at the higher RPM to provide more heat for the rear compartment, while providing still more cold for the front compartment, and the system "fights" itself.

Hot gas from the host unit has been used to defrost the remote evaporator, but the use of hot gas to heat the remote evaporator has had disadvantages. For example, ambient temperatures below 40 degrees F. limit the heating capacity of the remote evaporator.

Remote evaporators have also suffered disadvantages not related to heating. For example, in systems which utilize a three-way valve to select host heating and cooling modes, the remote evaporator cannot go into a cooling mode when the host unit is in a heating mode, because the three-way valve is switched from a cooling position to a heating position by a pilot solenoid when the host unit requires heat.

SUMMARY OF THE INVENTION

Briefly, the present invention is a new and improved compartmentalized transport refrigeration system, and method of operating same, including a host refrigeration unit which controls the temperature of the air in a first or front compartment of a trailer, and a remote evaporator unit which controls the temperature of the air in a second or rear compartment. The host unit includes a compressor, condenser, receiver, evaporator, accumulator, a three-way valve having heating and cooling positions, and liquid, hot gas and suction lines. Controllable valves selectively control the host's liquid and hot gas lines, with the valve for the hot gas line being disposed between the heating outlet port of the three-way valve and the host's evaporator coil. The remote unit includes liquid and hot gas lines selectively connectable to the liquid and hot gas lines, respectively, of the host unit, a suction line, and an evaporator. The host unit controls the temperature in the first compartment by cooling and null modes when the remote is in a heating mode, directing all of the hot compressor gas to the remote unit when the remote unit requires heat. When the remote unit requires cooling, host heating, if active, is terminated. Host cooling can occur simultaneously with remote cooling, but when host cooling is satisfied it is terminated and all of the refrigerant is directed to the remote unit while the host is in null.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF PREFERRED EMBODIMENTS

Figure 1:
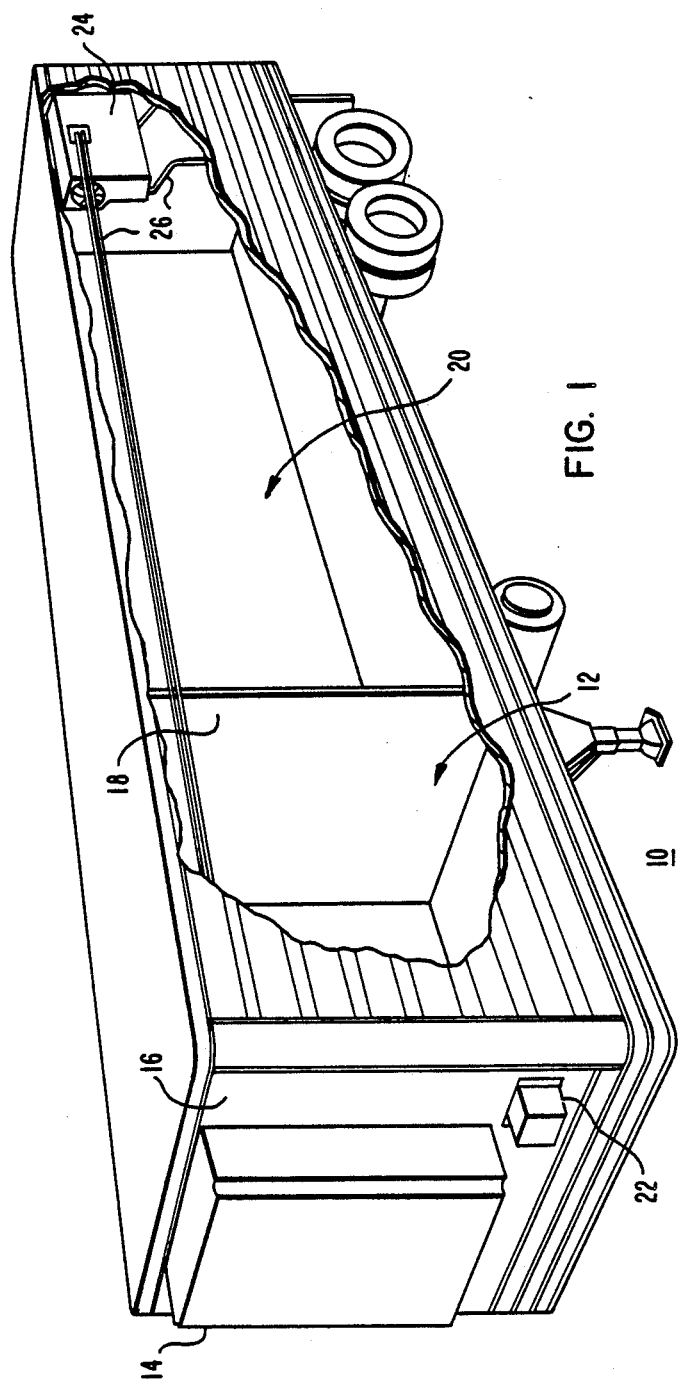
FIG. 1 is a perspective view, shown partially cut away, of a compartmentalized trailer which may have a transport refrigeration system constructed according to the teachings of the invention.

Referring now to the drawings, and to FIG. 1 in particular, there is shown a compartmentalized trailer 10 which may utilize the teachings of the invention. Trailer 10 includes a front compartment 12 which has its air temperature controlled by the main or host refrigeration unit 14 which is mounted on the vertical front surface 16 of the trailer 10. The front compartment 12 is normally used for frozen loads, with a typical set temperature being −10 degrees F. Vertical partition or wall 18 insulatingly separates the front compartment 12 from one or more rear compartments, with a single rear compartment 20 being shown for purposes of example.

Rear compartment 20 has its air temperature controlled by a remote refrigeration unit which includes a remote control box 22 mounted on the front surface 16 of the trailer 10, and one or more remote evaporator units in the rear compartment 20, with a single remote evaporator unit 24 being shown for purposes of example. Remote evaporator unit 24 includes piping and wiring, shown generally at 26, which connects the remote evaporator 24 unit with the host refrigeration unit 14 and with its remote control box 22. The rear compartment 20 is normally used for fresh loads, with the temperature set point being accurately controllable down to 35 degrees F. The specific temperature set point is dictated by the nature of the load being preserved.

Trailers with two remote compartments typically utilize a remote evaporator unit in each, and each has its own remote control box for separate temperature control of each compartment. It will become apparent from the description of a single rear compartment having a single remote evaporator unit how the teachings of the invention may be applied to trailer arrangements having two rear compartments, or a single rear compartment with two spaced remote evaporator units.

For purposes of example, the invention will be described with the host unit controlling a frozen load and the remote unit a fresh load, but the invention enables any desired combination, as desired by the user.

Figure 2:
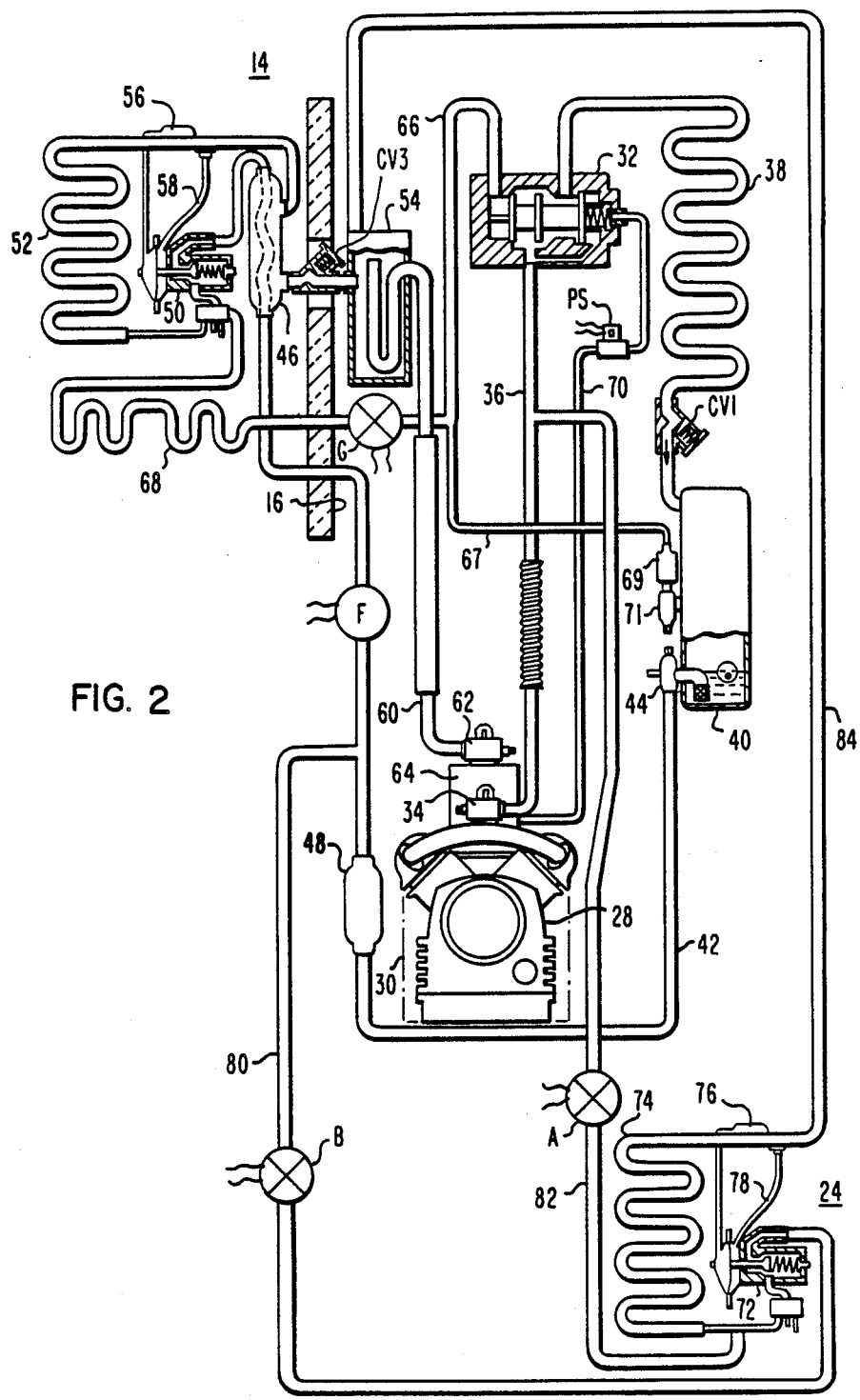
FIG. 2 is a schematic piping diagram of a transport refrigeration system constructed according to the teachings of the invention, which may be used in the compartmentalized trailer shown in FIG. 1.

FIG. 2 is a schematic piping diagram of the host refrigeration unit 14, the remote evaporator unit 24, and the piping interconnections between the units. FIG. 2 also illustrates the locations of controllable valves and check valves, which will be referred to when describing the invention. For purposes of example, the various valves and solenoids will be described as having a specified normal deenergized position, but it is to be understood that the opposite position or condition may be utilized simply by modifying the associated control accordingly.

U.S. Pat. Nos. 3,219,102; 4,325,224; and 4,419,866, which are assigned to the same assignee as the present application, describe transport refrigeration systems in detail, and they are hereby incorporated into the present application by reference so that the following description may concentrate on the inventive aspects of the compartmentalized transport refrigeration system.

More specifically, the host refrigeration unit 14 includes a closed fluid circuit which includes a refrigerant compressor 28 driven by a prime mover such as an internal combustion engine indicated generally by broken outline 30. The discharge ports of the compressor 28 are connected to an inlet port of a three-way valve 32 via a discharge service valve 34 and a hot gas conduit or line 36. The functions of the three-way valve 32, which has heating and cooling positions, may be provided by separate valves, if desired.

In the cooling position of three-way valve 32, one of the output ports of the three-way valve 32 is connected to the inlet side of a condenser coil 38. The outlet side of the condenser coil 38 is connected to a receiver tank 40 via a one-way condenser check valve CV1 which enables fluid flow only from the outlet side of the condenser coil 38 to the receiver tank. An outlet valve 44 on the receiver tank 40 is connected to a heat exchanger 46 via a liquid conduit or line 42 which includes a dehydrator 48. A normally open solenoid operated liquid line valve F is also disposed in the liquid line 42, between the heat exchanger 46 and the dehydrator 48.

The liquid refrigerant from liquid line 42 continues through a coil in the the heat exchanger 46 to an expansion valve 50. The outlet of the expansion valve 50 is connected to the input side of an evaporator coil 52, and the outlet side of evaporator coil 52 is connected to a closed accumulator tank 54 by way of the heat exchanger 46 and a one way check valve CV3. The expansion valve 50 is controlled by an expansion valve thermal bulb 56 and an equalizer line 58.

Gaseous refrigerant in the accumulator tank 54 is directed to the suction port of compressor 28 via a suction conduit or line 60, a suction line service valve 62, and a suction throttling valve 64.

In the heating position of three-way valve 32, a hot gas line or conduit 66 extends from a second outlet port of the three-way valve 32 to the inlet side of the evaporator coil 52 via a normally closed, solenoid operated hot gas valve G and a defrost pan heater 68, with the latter being located below the evaporator coil 52. A by-pass conduit 67 or pressurizing tap extends from the hot gas line 66 to the receiver tank 40 via a by-pass check valve 69 and a by-pass service valve 71. It is important that by-pass conduit 67 taps hot gas line 66 between valve G and the three-way valve 32, to insure that the receiver tank 40 is pressurized when the three-way valve is in its heating position, regardless of which evaporator requires hot gas heating.

Three-way valve 32 is controlled by pressure obtained from the intake side of compressor 28 via a conduit 70 which includes a normally closed pilot solenoid valve PS. When the solenoid operated valve PS is closed, the three-way valve 32 is spring biased to the cooling position, to direct the hot, high pressure gas from the compressor 28 to the condenser coil 38. Condenser coil 38 removes heat from the gas and condenses the gas to a lower pressure liquid. When the evaporator requires defrosting, and also when a heating mode is required to hold the set point selected by a thermostat, the pilot solenoid valve PS is opened and the compressor pressure operates the three-way valve 32 to its heating position. Valve G is also operated to its open position, to cause the hot, high pressure gas from the compressor 28 to flow through valve G, the defrost pan heater 68, and then through the evaporator coil 52, by-passing the expansion valve 50. During the defrost cycle, the evaporator fan (not shown) is not operated, while during a heating cycle required to hold the set temperature, the evaporator fan is operated.

The remote evaporator unit 24 includes an expansion valve 72, an evaporator coil 74, a thermal bulb 76, and an equalizer line 78. A remote liquid line 80 interconnects the liquid line 42 of the host unit 14 with the remote expansion valve 72. The remote liquid line 80 taps the host liquid line 42 at a point between the dehydrator 48 and the host liquid line valve F. A normally closed solenoid operated liquid line valve B is disposed in the remote liquid line 80, which, when energized to open the valve, initiates a cooling mode in the remote evaporator unit 24.

The remote evaporator unit 24 also includes a remote hot gas line 82 which interconnects the input side of the remote evaporator coil 74 with the hot gas line 36 of the host unit 14. A normally closed, solenoid operated hot gas valve A is disposed in the remote hot gas line 82, which, when energized to open valve A, initiates a heating mode in the remote evaporator unit 24.

The remote evaporator unit 24 is completed by a remote suction line 84 which extends from the outlet side of the remote evaporator coil 74 to the accumulator tank 54.

While the use of an accumulator 54 is recommended to assure proper operation of the system at all ambients, it is not essential to the invention. The check valve CV3 would still be required between the heat exchanger 46 and the point where the remote suction line 84 would tap the host suction line 60. If an accumulator is not used, remote suction line 84 would tap host suction line 60 between check valve CV3 and compressor 28.

Figure 3:
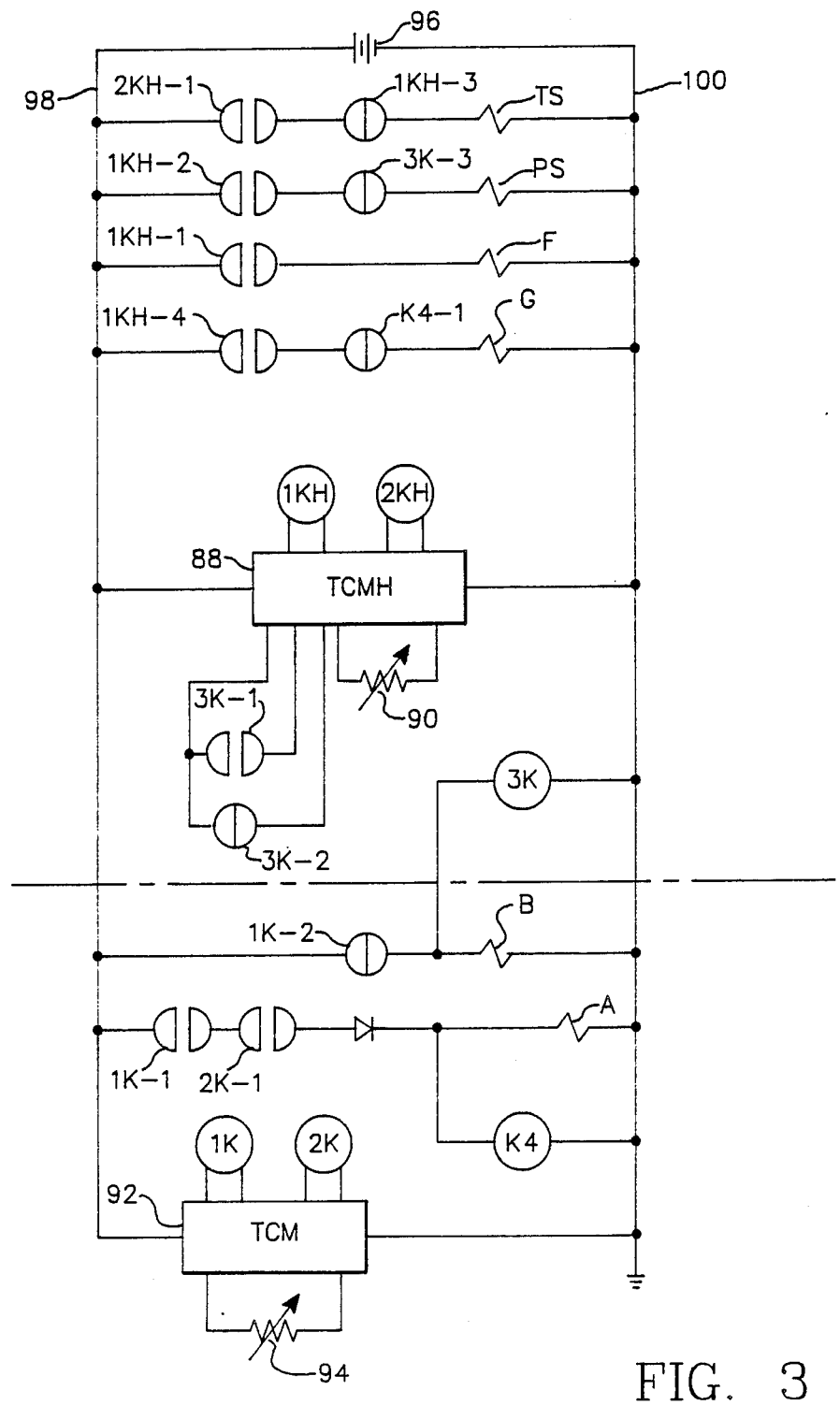
FIG. 3 is a schematic electrical diagram illustrating how the valves of the piping diagram of FIG. 2 may be electrically controlled according to the teachings of the invention.

FIG. 3 is an electrical schematic diagram of the host unit 14 and the remote unit 24, connected according to the teachings of the invention.

Figure 4:
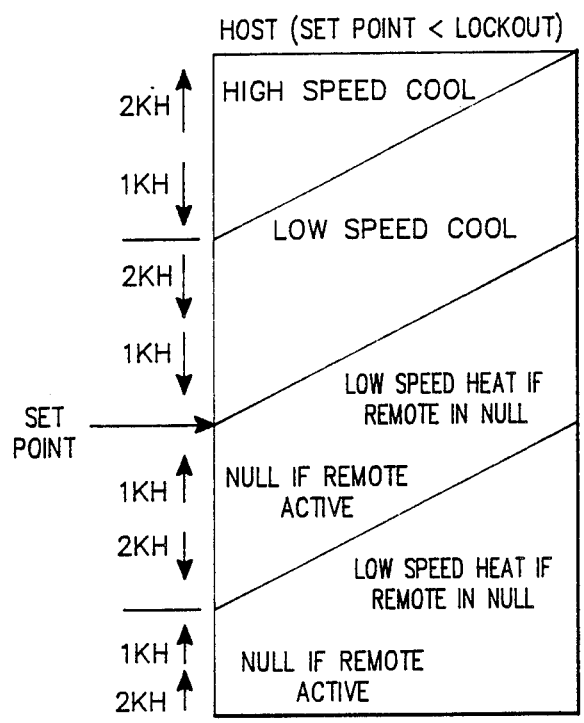
FIG. 4 is a diagram which illustrates the operating modes of the host unit.

The host unit 14 includes a thermostat 88 having a temperature control module TCMH, a temperature sensor 90 disposed in the front compartment 12, a heat relay 1KH and a speed relay 2KH. FIG. 4 is a diagram which illustrates the sequence in which the heat relay 1KH and the speed relay 2KH operate, with the sequence for a falling temperature descending along the left side of the diagram, and with the sequence for a rising temperature rising along the right side of the diagram. An upwardly pointing arrow indicates the associated relay is energized, and a downwardly pointing arrow indicates the associated relay is dropped out. When the speed relay 2KH is energized, the throttle of the prime mover 30 is in the high speed position, and when the speed relay 2KH is deenergized, the throttle of the prime mover 30 is in the low speed position. When the heat relay 1KH is deenergized, a cooling mode is selected, and when the heat relay 1KH is energized, a heat mode is selected. The condenser and evaporator fan circuits, as well as the defrost circuits are not shown in FIG. 3 in order to simplify the schematic. The various heating, cooling and null modes are shown in the diagram for a continuous run operation. It is also possible to operate the system with modes in which the compressor is not run continuously, as described in incorporated U.S. Pat. No. 4,419,866.

Figure 5:
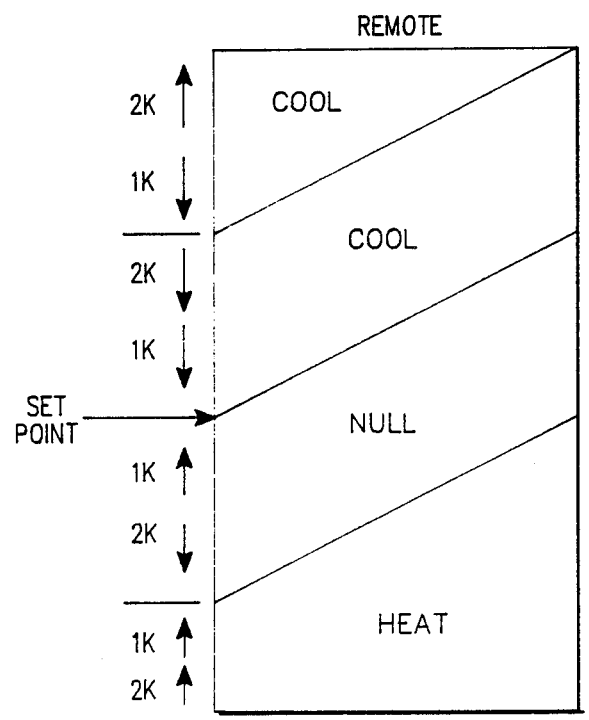
FIG. 5 is a diagram which illustrates the operating modes of the remote unit.

The remote unit 24 includes a thermostat 92 having a temperature control module TCM, a temperature sensor 94 disposed in the rear compartment 20, a heat relay 1K and a speed relay 2K. FIG. 5 is a diagram similar to that of FIG. 4 except illustrating the operation of the heat and speed relays 1K and 2K, respectively, and the associated heat, cool and null modes. A "null" mode indicates the heating and cooling requirements are satisfied, and the temperature of the air in the associated compartment is within a predetermined small band relative to the temperature set point selected on the associated thermostat.

In the normal operation of the thermostats 88 and 92, which thermostats are commercially available from the assignee of the present application, if a temperature set point is selected below a predetermined value, called the lock-out point, which may be in the range of 15 to 20 degrees F., for example, the high speed heat mode is locked out, but low speed heat is still normally a viable mode which is initiated when the temperature is in a predetermined range below the set point. When a set point is selected for the host unit which is below the lock-out point, all host unit heat modes are locked out when the host unit receives a signal from the remote unit that the remote unit is in a cooling mode. This signal may be provided by heat lock-out relay 3K which is connected to be energized by the same voltage which energizes the remote liquid line valve B. Thus, when the remote liquid line valve B is energized to initiate a cooling mode in the remote unit 24, the heat lock-out relay 3K is simultaneously energized. Contacts 3K-1 and 3K-2 are connected to the temperature control module TCMH to cut out all host unit heating modes when the remote unit 24 calls for cooling and the temperature set point is below the lock-out temperature.

More specifically, a battery 96 energizes a pair of conductors 98 and 100. A throttle solenoid TS, which controls the speed selection of the prime mover 30 is connected between the conductors 98 and 100 via normally open contacts 2KH-1 of the host speed relay 2KH and the normally closed contacts 1KH-3 of the host heat relay 1KH. When the host heat relay 1KH is dropped out, indicating host cooling is required, the throttle solenoid TS will be picked up to advance the throttle to the high speed position if the host speed relay 2KH is energized. When the compartment temperature nears set point and the speed relay 2KH drops out, contacts 2KH-1 open and solenoid TS drops out to select the low speed position of the throttle. Normally closed contacts 1KH-3 of the host heat relay disable the high speed heat mode.

The pilot solenoid PS is connected across conductors 98 and 100 via normally open contacts 1KH-2 of the host heat relay and normally closed contacts 3K-3 of the lock-out relay 3K. When the host heat relay 1KH is dropped out the pilot solenoid PS is deenergized and the three-way valve 32 is biased to the "cooling" position. When the host heat relay 1KH picks up, its contacts 1KH-2 close to energize and open the pilot solenoid PS, which applies compressor pressure to the three-way valve 32 to shift it to the "heating" position. If valve B is energized to initiate remote cooling, relay 3K also picks up. If the pilot solenoid PS is in the "heat" position at this time it is deenergized and closed when relay 3K picks up, to cause the three-way valve 32 to return to the "cool" position.

Host liquid line solenoid valve F is connected across conductors 98 and 100 via normally open contacts 1KH-1 of the host heat relay 1KH.

Host hot gas line solenoid valve G is connected across conductors 98 and 100 via normally open contacts 1KH-4 of the host heat relay and the normally closed contacts K4-1 of a hot gas lock-out relay K4.

The normally closed remote liquid line solenoid operated valve B is connected across conductors 98 and 100 via normally closed contacts 1K-2 of the remote heat relay 1K. When heat relay 1K is dropped out, contacts 1K-2 are closed, solenoid valve B is energized to cause it to open, and the remote unit 24 is in a cooling mode. When remote heat relay 1K picks up, contacts 1K-2 open, solenoid valve B drops out to cause it to close, which terminates the remote cooling mode and return it to null. As hereinbefore stated, the heat lock-out relay 3K is connected to be energized by the same voltage which energizes the remote liquid line solenoid valve B.

The normally closed remote hot gas solenoid valve A is connected across conductors 98 and 100 via serially connected normally open contacts 1K-1 and 2K-1 of the remote heat and speed relays 1K and 2K, respectively. When either, or both, of the heat and speed relays 1K and 2K are dropped out, solenoid valve A will be deenergized and closed, preventing a defrost or a heat cycle. Both the remote heat and speed relays 1K and 2K, respectively, must be energized before the hot gas line 82 to the remote unit 24 will be opened by the remote hot gas solenoid valve A.

It will be noted in FIG. 3 that the hereinbefore mentioned hot gas lock-out relay K4 is connected to be energized by the same voltage which energizes the remote hot gas solenoid A. Normally closed contacts K4-1 of relay K4 are used in the circuit of the host hot gas line solenoid valve G, along with normally open contacts 1KH-4 of the host heat relay 1KH. Thus, if the host heat relay 1KH picks up requesting a host heating mode, valve G will open only if the remote unit is not in a heating mode. Thus, remote heating takes precedence over host heating.

In the operation of the transport refrigeration system according to the teachings of the invention, it will be assumed that the the temperature set point of the host unit 14 is below the heat lock-out temperature. This will be the normal situation, as the host unit 14 will normally be controlling the temperature of a frozen load to a predetermined temperature below 0 degrees F.

When the thermostat of the remote unit 24 calls for a cooling mode, the heat relay 1K will drop out, constacs 1K-2 will close, the remote liquid line solenoid valve B will open to allow liquid refrigerant from the liquid line 42 of the host unit to enter the remote evaporator coil 74. The heat lock-out relay 3K will pick up to lock out all heat modes, ie., both low speed and high speed, in the host unit 14. In addition, valve A will be deenergized and thus closed. Depending on how far the actual compartment temperature is above the set point, the cooling mode may be high speed cool, or low speed cool, and the remote cooling process will not be interfered with by the host unit going into a heating mode, as the host unit 14 can only heat when the remote is in null.

If the host unit 14 requires cooling while the remote unit 24 is cooling, heat relay 1KH will be deenergized and the host liquid line valve F will open, allowing simultaneous cooling of both the host and remote units. If the host unit is in high speed cool, ie., speed relay 2KH is picked up, as the temperature of the front compartment 12 nears set point, relay 2KH will drop out and its contacts 2KH-1 will open to drop the throttle solenoid TS and select the lower of the two prime mover speeds. If the host unit 14 reaches its set point before the remote unit reaches its set point, heat relay 1KH will pick up and its contacts 1KH-1 will close to energize valve F and close the host liquid line feeding the host evaporator coil 52, to terminate host cooling. When the remote unit 24 reaches its set point, relay 1K will pick up, its contacts 1K-2 will open, and the remote liquid line valve B will drop out and close to terminate remote cooling. In a system which allows the prime mover to stop during null periods, the prime mover would stop at this point since both systems are satisfied. In a continuous run system, at least one refrigerant circuit must be active at all times. According to the invention, when the remote unit goes into null while the host cooling requirements are satisfied and is also in null, the host unit is forced out of null into a heating mode. This is accomplished by relay 3K dropping out when remote liquid line solenoid valve B drops out and closes. Contacts 3K-3 close and they, along with contacts 1KH-2 of the host heat relay, which are closed, establish a circuit which energizes the pilot solenoid PS. The pilot solenoid PS opens and switches the three-way valve 32 to the heat position. Hot gas solenoid valve G is also energized and opened at this point to allow hot gas to flow through the host evaporator coil 52, as relay K4 is dropped out and heat relay 1KH is energized, establishing a circuit for valve G via contacts K4-1 and 1KH-4, respectively.

If the remote unit 24 should require heat while the host unit 14 is heating, the remote hot gas solenoid valve A will be energized to open the remote hot gas line 82 to the remote unit 24. When valve A is picked up, hot gas lock-out relay K4 also picks up to open the circuit which includes solenoid valve G, terminating host heating and making all of the hot gas from the compressor 28 immediately available to satisfy the remote heating requirements. This feature of the remote taking heating preference over the host is important, as the remote will normally be controlling a perishable load and must be able to accurately follow the remote set point. The host, which will normally be controlling a frozen load, need not be as accurate on the low side of the set point.

If cooling should now be required by the host unit 14, relay 1KH will drop out, its contacts 1KH-1 will open, host liquid line solenoid valve F will drop out and open, contacts 1KH-4 will open, solenoid valve G will drop out and close, contacts 1KH-2 will open, and the pilot solenoid PS will drop out and close to select the cooling position of three-way valve 32.

If cooling should be required by the remote unit 24 while the host unit 14 is heating, relay 1K will drop out and its contacts 1K-2 will close to pick up the remote liquid line relay B and open the liquid line 80 to the remote evaporator coil 74. The hot gas lock-out relay 3K will also pick up, its contacts 3K-3 will open to drop the pilot solenoid PS, and the three-way valve 32 will be switched to the "cool" position.

It is also possible to heat in the remote unit 24 while cooling in the host unit 14. Valve A will energize to initiate remote heating while the pilot solenoid PS is in the "cool" position. This allows the host liquid line solenoid valve F to be open and provide host cooling. As soon as host cooling is satisfied, ie., the host heat relay 1KH picks up, the pilot solenoid will be energized to switch the three-way valve to "heat". Host heating is prevented, however, while the remote is heating, as hereinbefore explained. When remote heating terminates, host heating will be initiated.

Check valve CV3 is automatic in operation. Its function is to prevent excessive liquid refrigerant from collecting in the host evaporator coil 52 when the remote unit 24 is in a heating mode.

The following Table summarizes the functions of the host and remote units 14 and 24, respectively.

TABLE

| REMOTE | HOST |
| --- | --- |
| Remote in null. | Host can cool. |
| Remote in null. | Host can heat. |
| Remote in null. | Host cannot be in null but is forced to heat. |
| Remote in cool. | Host can cool. |
| Remote in cool. | Host can be in null. |
| Remote in cool. | Host cannot heat but will be forced to null. |
| Remote in heat. | Host can cool. |
| Remote in heat. | Host can be in null. |
| Remote in heat. | Host cannot heat- remote takes precedence- host goes to null. |

We claim as our invention:
1. A compartmentalized transport refrigeration system, comprising:
   a trailer having a first compartment,
   a host refrigeration unit for controlling the air temperature of said first compartment via heating, cooling, and null modes,
   said host unit comprising a closed fluid circuit which includes a compressor, condenser, receiver, expansion valve, evaporator, and liquid, hot gas and suction lines, first valve means connected in said closed fluid circuit to direct fluid flow from the high pressure side of said compressor to: (a) said condenser when said host unit is in a cooling mode, and (b) to said evaporator via a hot gas line which by-passes the expansion valve when said hot unit is in a heating mode, second valve means for selectively enabling and blocking fluid flow through said host hot gas line, third valve means for selectively enabling and blocking fluid flow through said host liquid line, a second compartment in said trailer, a remote unit for controlling the air temperature of said second compartment via heating, cooling, and null modes, said remote unit including an evaporator, and liquid, hot gas and suction lines connected to the liquid, hot gas, and suction lines of said host unit, respectively, fourth and fifth valve means for respectively and selectively enabling and blocking fluid flow between said remote liquid and hot gas lines and said host unit, and control means for selecting the heating mode of said first valve means, and the fluid blocking positions of said second and fourth valve means, when the fifth valve means connects the hot gas line of the host unit to the remote evaporator, to enhance the heating capability of the remote evaporator by directing the entire output of the compressor to the remote evaporator when the remote unit requires heat.

2. The transport refrigeration system of claim 1 including one-way check valve means disposed in the host suction line to block fluid flow from the remote suction line to the host evaporator when the host unit is in null.

3. The transport refrigeration system of claim 1 including:

an accumulator connected in the host suction line, between the host evaporator and the compressor, one-way check valve means disposed between the host evaporator and the accumulator, to prevent fluid flow from the accumulator to the evaporator while the second valve means is blocking fluid flow to the host evaporator, with the interconnection of the host and remote suction lines being on the accumulator side of said check valve means.

4. The transport refrigeration system of claim 1 including a pressurizing tap connected from the host hot gas line to the receiver, with the host hot gas line being tapped between the first and second valve means.

* * * * *